I. R. SOLOMON.
BATTERY APPARATUS.
APPLICATION FILED SEPT. 11, 1918.
1,365,801.
Patented Jan. 18, 1921.
2 SHEETS—SHEET 2.
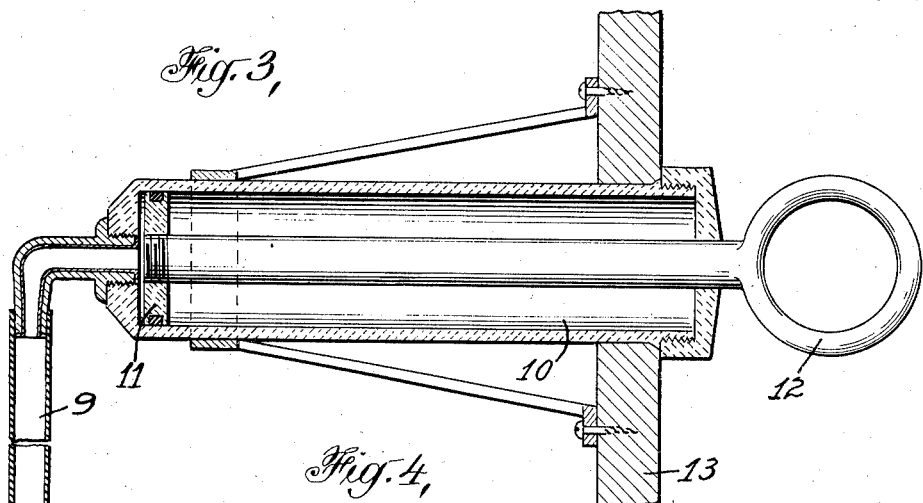
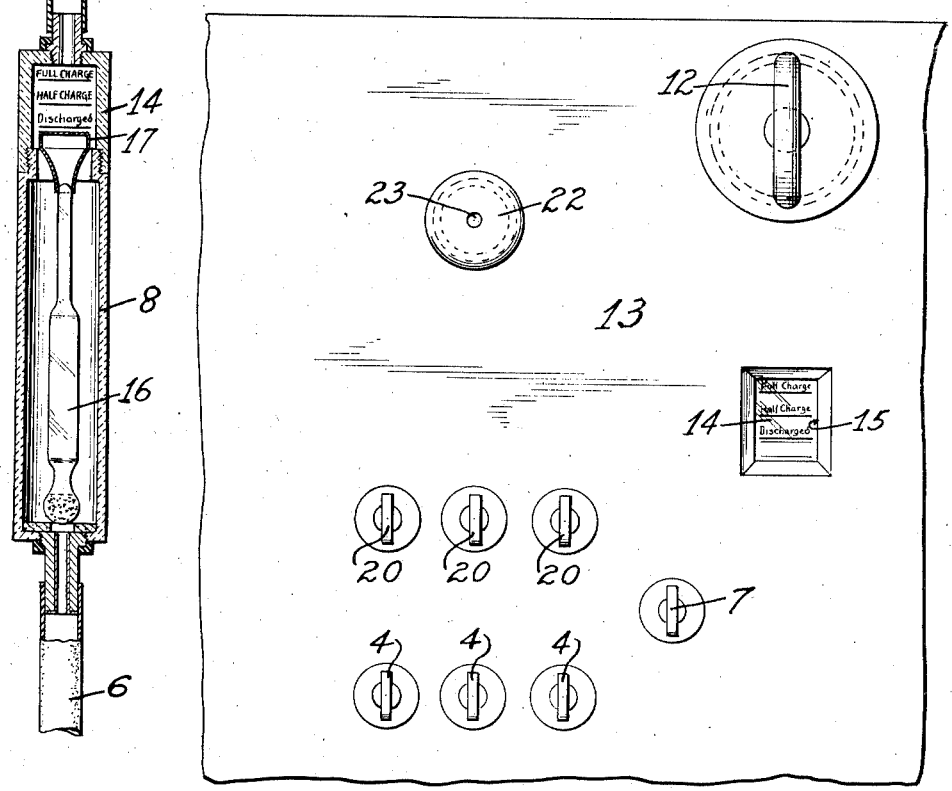
Inventor
Irving R. Solomon
By His Attorney
Leon N. Rosenthal

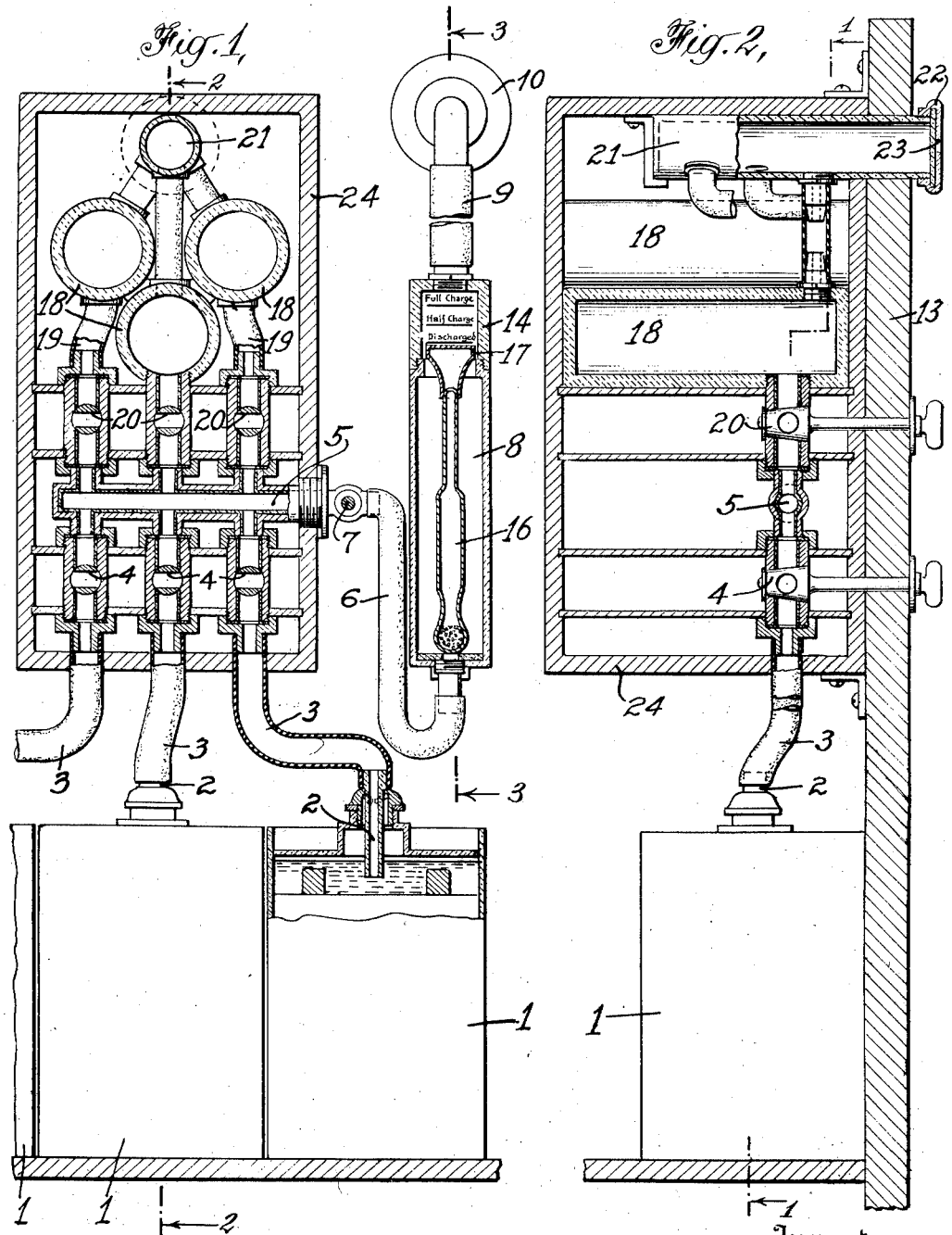

UNITED STATES PATENT OFFICE.

IRVING R. SOLOMON, OF LOS ANGELES, CALIFORNIA.

BATTERY APPARATUS.

1,365,801.

Specification of Letters Patent.   Patented Jan. 18, 1921.

Application filed September 11, 1918. Serial No. 253,552.

*To all whom it may concern:*

Be it known that I, IRVING R. SOLOMON, a citizen of the United States, residing at Los Angeles, in the county of Los Angeles, State of California, have invented certain new and useful Improvements in Battery Apparatus; and I do hereby declare the following to be a full, clear, and exact description of the invention, such as will enable others skilled in the art to which it appertains to make and use the same.

The present invention relates to battery apparatus and more particularly to apparatus for replenishing the electrolyte and testing the level and specific gravity of the electrolyte of the individual cells of a battery at a place remote therefrom, such as at the dash board of a moving vehicle, or at a testing stand, the apparatus for the several purposes being provided separately or in various combinations as desired.

As is well known, one or more of the cells of a battery, and particularly of a storage battery, may become discharged or require replenishing with water or acid, while the other cells are still in operative condition, although the cells are electrically connected to the same charging and working circuit. Thus, a test on one cell may be entirely misleading as to the condition of the other cells of the same battery, so that when such tests were made heretofore, it was usual to first uncover or remove the battery and to then open each cell individually to determine the level and specific gravity of the electrolyte therein. This procedure is usually so inconvenient that under ordinary circumstances the battery is not given the care required for its efficient operation, with the result that the plates of one or more of the cells soon become warped, sulfated or disintegrated and finally destroy the usefulness of the entire battery after unusually brief service.

The object of my invention is to overcome the foregoing difficulties and thereby enable the operator of the moving vehicle, or the service man of a garage, to more reliably and speedily ascertain the condition of the individual cells of a battery and to readily correct the faults that may exist in one or more of the cells, at a place remote from the battery, thereby improving the operation of the battery and prolonging its life.

In accordance with my invention, I provide a valved conduit for connection to the interior of each cell. Where the apparatus comprehends replenishing means only, I may provide one replenishing tank, or a number of replenishing tanks equal to the number of cells. In the latter case the valved conduits may extend directly to the respective tanks, and the capacity of each tank may be just sufficient to replenish the cell with distilled water after a prescribed period of service. Preferably, however, the conduits from the individual cells are connected to a manifold, and the conduit leading from each replenishing tank is connected to the same manifold. If testing apparatus for determining the level of the electrolyte is to be provided in addition to the replenishing apparatus, then means for withdrawing electrolyte from the cells individually, and for returning the electrolyte thereto, are connected to the same manifold. With this apparatus, the electrolyte of any one of the cells may be replenished by establishing a connection between the replenishing tank and the particular cell, and, if the testing apparatus also is provided, the level of the electrolyte in any one of the cells may be determined by withdrawing electrolyte from a point near the top of the plates in the particular cell under test into a measuring apparatus. This measuring apparatus may include a barrel connected on one side to the manifold and on the other side to a pump, so that if the barrel is filled with electrolyte upon operation of the pump, it is determined that the level of the electrolyte is at a sufficient height about the plates; and if not, that the electrolyte should be replenished. By arranging a hydrometer in the barrel, the specific gravity of the electrolyte may be determined also. The apparatus for testing the specific gravity of the electrolyte may be provided with or without the replenishing apparatus, and with or without the apparatus for testing the level of the electrolyte, but where either or both are provided in combination with the replenishing apparatus, a valve is arranged in the conduit between the testing apparatus and the manifold to prevent interference when the replenishing apparatus is being used, and a valve is arranged in the conduit between each replenishing tank and the manifold to prevent interference when the testing apparatus is being used.

In any of these arrangements, I prefer to mount the controlling and operating apparatus on the face of a panel board, such as the dash board of a moving vehicle or on a testing stand. In the latter case, the conduits for connection to the individual cells are such that they may be readily connected to openings in the covers of the cells, when the battery is removed from the moving vehicle or is in place thereon.

In the accompanying drawings illustrating the preferred form of my invention in application, as an example, to a storage battery having three cells, and to an equipment in which the replenishing and the testing apparatus are combined, Figure 1 is a sectional front elevation on line 1—1 of Fig. 2; Fig. 2 is a section on line 2—2 of Fig. 1; Fig. 3 is a section on line 3—3 of Fig. 1; and Fig. 4 is a front view of the panel board.

Each cell 1 of the storage battery has a duct 2 extending tightly through the cover of the cell to a point about level with the top of the plate therein. The ducts are individually connected through the flexible conduits 3 and the valves 4 to a manifold 5, the end of which is connected to the conduit 6 and valve 7 to the lower end of the testing barrel 8. The top of the barrel is connected through the conduit 9 to one end of the pump 10 having a piston 11 connected to the operating handle 12 on the face of the panel board 13. Each of the valves 4, and also the valve 7, has an operating handle extending to the front of the panel board 13, and the upper transparent portion 14 of the testing barrel is visible through a window 15 in the panel board.

By opening one of the valves 4, and also the valve 7, the barrel 8 is placed in communication with a single one of the cells at will, so that upon then drawing out the piston 11 of the pump, the electrolyte of the cell to be tested is sucked into the barrel 8, if the electrolyte in the cell was normally above the lower end of the duct 2. On the other hand, if the electrolyte was normally below that level, the fact will be indicated by an absence of electrolyte in the barrel when the pump is operated. In general, the level of the electrolyte above the top of the plates is indicated, when the handle of the pump is fully drawn out, by the fact that the transparent portion 14 of the barrel is or is not entirely filled, the capacity of the barrel together with the connecting tubes and manifold, and the capacity of the pump being properly correlated with the size of the cells to be tested. In this way, the apparatus determines with sufficient accuracy whether or not the electrolyte of any one or more of the cells should be replenished.

A float hydrometer 16 is arranged in the barrel, and carried by this hydrometer is an indicating float 17 coöperating with a specific gravity scale marked in the transparent portion 14 of the barrel. Thus to test each of the cells individually, the electrolyte of one cell at a time is sucked to a predetermined level in the barrel 8 by withdrawing the piston of the pump 10 to a predetermined position in its cylinder. At this level, the indicating float 17 carried by the hydrometer will indicate "discharge," "half charge," or "full charge," or values intermediate thereof, dependent upon the specific gravity of the electrolyte then in the barrel. If desired, the specific gravity may be determined by using a graduated hydrometer and filling the testing barrel with electrolyte to any level in the transparent portion.

The apparatus for replenishing the electrolyte of the individual cells by adding distilled water or acid thereto consists of a plurality of replenishing tanks 18, one for each cell 1, connected to the manifold 5 through the conduit 19 and valves 20, and also connected to a master tank 21 having a detachable cover 22 for filling all the replenishing tanks. Each of these replenishing tanks has a capacity substantially equal to the quantity of distilled water required to fill a cell after the usual period of operation of the battery, so that, if desired, the operator may replenish the electrolyte of the several cells with water without determining the level of the electrolyte in the cells. Each of the valves 20 has an operating handle extending to the face of the panel board 13, and the master tank extends through the panel board so that its detachable cover 22 is readily removable. The sight opening 23 is serviceable in quickly ascertaining whether or not the replenishing tanks are completely filled.

The replenishing tanks 18 may be filled at any time by unscrewing the cover 22 and pouring the required amount of water or acid therein. Ordinarily, the water is poured into the master tank until a small quantity of liquid remains in it. The cover is then screwed into place so that the replenishing apparatus is substantially sealed to the atmosphere to prevent excessive evaporation, but not so tightly as to prevent the flow from the tanks into the cells when the valves are opened for that purpose. The electrolyte of any one of the cells may then be replenished by opening the two valves 4 and 20 leading from that replenishing tank to the cell in question, the remaining valves 4, 20 and 7 being closed; or, if desired, the liquid contained in more than one of the replenishing tanks may be emptied into any one of the cells by opening more than one of the valves 20.

As shown particularly in Figs. 1 and 2, some of the apparatus is arranged in a box 24 attached to the back of the panel board 13. The parts holding or conducting the electrolyte or replenishing liquid are made of hard rubber or other material that is not affected by the electrolyte and does not affect the chemical purity of the distilled water.

Having thus described the invention what I claim is:—

1. In battery apparatus, the combination with a plurality of cells each having an opening to the interior thereof, of apparatus for testing and replenishing the electrolyte of the cells individually, comprising a manifold, conduits for connecting the manifold with said openings, a valve in each of said conduits, a replenishing tank communicating with the manifold, and measuring apparatus connected to the manifold for determining the level of the electrolyte in any one of the cells.

2. In battery apparatus, the combination with a plurality of cells each having an opening to the interior thereof, of apparatus for testing and replenishing the electrolyte of the cells individually, comprising a manifold, conduits for connecting the manifold with said openings, a valve in each of said conduits, a number of replenishing tanks equal to the number of cells, valved conduits connecting the individual replenishing tanks with the manifold, means for filling the replenishing tanks, and measuring apparatus connected to the manifold for determining the level of the electrolyte in any one of the cells.

3. In battery apparatus, the combination with a plurality of cells each having an opening to the interior thereof, of apparatus for testing and replenishing the electrolyte of the cells individually, comprising a manifold, conduits for connecting the manifold with said openings, a valve in each of said conduits, a replenishing tank communicating with the manifold, a measuring barrel, a valved conduit connecting the measuring barrel with the manifold, and a pump connected to the measuring barrel to withdraw electrolyte from any one of the cells and to subsequently return the electrolyte to the cell.

4. In battery apparatus, the combination with a plurality of cells each having an opening to the interior thereof, of apparatus for testing and replenishing the electrolyte of the cells individually, comprising a manifold, conduits for connecting the manifold with said openings, a valve in each of said conduits, a number of replenishing tanks equal to the number of cells, valved conduits connecting the tanks with the manifold, a master tank connected to all the replenishing tanks for filling them, a measuring barrel, a valved conduit connecting the measuring barrel with the manifold, and a pump connected to the measuring barrel to withdraw electrolyte from any one of the cells into the measuring barrel and to subsequently return the electrolyte to the cell.

5. In battery apparatus, the combination with a plurality of cells each having an opening to the interior thereof, of apparatus for testing and replenishing the electrolyte of the cells individually, comprising a manifold, conduits for connecting the manifold with said openings, a number of replenishing tanks equal to the number of cells, conduits connecting the individual tanks with the manifold, a panel board, a master tank connected to all the replenishing tanks for filling them and having a detachable cover arranged at the face of the panel board, a measuring barrel having a portion visible at the face of the panel board, a conduit connecting the measuring barrel with the manifold, a pump connected to the measuring barrel to withdraw electrolyte from any one of the cells into the measuring barrel and to subsequently return the electrolyte to the cell, and a valve arranged in each of said conduits and operable from the face of the panel board.

6. In battery apparatus, the combination with a plurality of cells and a duct for each cell extending from the interior to the level of the top of the plates therein, of apparatus for testing the electrolyte of the cells individually, comprising a barrel connected to the individual ducts and having a visible portion, and pumping mechanism arranged to withdraw electrolyte from any one of the cells into the barrel and to subsequently return the electrolyte to the cell, the capacity of the barrel and the pumping mechanism being such that the electrolyte rises to said visible portion when the electrolyte is normally at or above a predetermined level in the cell.

7. In battery apparatus, the combination with a plurality of cells each having an opening to the interior thereof, of apparatus for testing the electrolyte of the cells individually, comprising a pumping mechanism and conduits for connecting the pumping mechanism with said openings to withdraw electrolyte from any one of the cells and to subsequently return the electrolyte to the cell, and a hydrometer arranged in a conduit connected to the pumping mechanism to test the specific gravity of the electrolyte withdrawn from a cell.

8. In battery apparatus, the combination with a plurality of cells each having an opening to the interior thereof, of apparatus for testing the electrolyte of the cells individually comprising a barrel having a visible portion, a hydrometer arranged in said barrel to indicate at said visible portion the specific gravity of the electrolyte in said barrel, conduits connecting the barrel with said openings, and pumping mechanism arranged to withdraw electrolyte from any one of the cells into the barrel and to subsequently return the electrolyte to the cell.

9. In battery apparatus, the combination with a plurality of cells each having an opening to the interior thereof, of apparatus for testing the electrolyte of the cell individually, comprising a manifold, conduits for connecting the manifold with said openings, a valve in each of said conduits, means including a conduit for withdrawing electrolyte from any one of the cells and for subsequently returning it thereto, and a hydrometer arranged in the last named conduit for testing the specific gravity of the electrolyte withdrawn from the cell.

10. In battery apparatus, the combination with a plurality of cells each having an opening to the interior thereof, of apparatus for testing the electrolyte of the cells individually, comprising a manifold, conduits for connecting the manifold with said openings, a valve in each of said conduits, a barrel connected with the manifold and having a visible portion, a hydrometer arranged in the barrel and coöperating with the visible portion to indicate the specific gravity of the electrolyte therein, and a pump for withdrawing electrolyte from any one of the cells into the barrel and for subsequently returning the electrolyte to the cell.

11. In battery apparatus, the combination with a plurality of cells each having an opening to the interior thereof, of apparatus for testing the electrolyte of the cells individually, comprising a manifold, conduits for connecting the manifold with said openings, a panel board, a barrel connected to the manifold and having a portion visible at the face of the panel board, a hydrometer arranged in the barrel and coöperating with the visible portion to indicate the specific gravity of the electrolyte therein, a pump operable from the face of the panel board for withdrawing electrolyte from any one of the cells into the barrel and for subsequently returning the electrolyte to the cell, and a valve arranged in each of said conduits and operable from the face of the panel board.

12. In battery apparatus, the combination with a plurality of cells each having an opening to the interior thereof, of apparatus for testing and replenishing the electrolyte of the cells individually, comprising a manifold, conduits for connecting the manifold with said openings, a valve in each of said conduits, a replenishing tank, a valved conduit connecting the replenishing tank with the manifold, a testing barrel, a valved conduit connecting the testing apparatus with the manifold, and a pump for withdrawing electrolyte from any one of the cells into the testing barrel and for subsequently returning the electrolyte to the cell.

13. In battery apparatus, the combination with a plurality of cells each having an opening to the interior thereof, of apparatus for testing and replenishing the electrolyte of the cells individually, comprising a manifold, valved conduits for connecting the manifold with said openings, a number of replenishing tanks equal to the number of cells, valved conduits connecting the replenishing tanks with the manifold, a testing barrel, a valved conduit connecting the testing barrel with the manifold, a pump connected to the testing barrel, and a hydrometer arranged within the testing barrel.

14. In battery apparatus, the combination with a plurality of cells each having an opening to the interior thereof, of apparatus for testing and replenishing the electrolyte of the cells individually, comprising a manifold, conduits for connecting the manifold with said openings, a number of replenishing tanks equal to the number of cells, conduits connecting the replenishing tanks with the manifold, a panel board, means at the face of the panel board for filling the replenishing tanks, a testing barrel, a conduit connecting the testing barrel with the manifold, a hydrometer arranged in the testing barrel and having a portion visible at the face of the panel board, a pump connected to the testing barrel and being operable from the face of the panel board, and valves arranged in said conduits and being operable from the face of the panel board.

In testimony whereof I affix my signature.

IRVING R. SOLOMON.